US006856398B2

(12) United States Patent
Ruchet

(10) Patent No.: US 6,856,398 B2
(45) Date of Patent: Feb. 15, 2005

(54) METHOD OF AND APPARATUS FOR MAKING WAVELENGTH-RESOLVED POLARIMETRIC MEASUREMENTS

(75) Inventor: Bernard Ruchet, Charlesbourg (CA)

(73) Assignee: EXFO Electro-Optical Engineering Inc., Vanier (CA)

( * ) Notice: Subject to any disclaimer, the term of this patent is extended or adjusted under 35 U.S.C. 154(b) by 290 days.

(21) Appl. No.: 10/281,588

(22) Filed: Oct. 23, 2002

(65) Prior Publication Data

US 2003/0095264 A1 May 22, 2003

Related U.S. Application Data

(60) Provisional application No. 60/330,528, filed on Oct. 24, 2001.

(51) Int. Cl.[7] ............................. G01B 9/02; G01N 21/00
(52) U.S. Cl. ...................... 356/453; 356/73.1; 356/491; 356/477
(58) Field of Search .............................. 356/73.1, 453, 356/477, 479, 487, 491; 250/227.19, 227.27

(56) References Cited

U.S. PATENT DOCUMENTS

| | | | | |
|---|---|---|---|---|
| 4,523,847 A | * | 6/1985 | Bjorklund et al. | 356/453 |
| 6,323,950 B1 | * | 11/2001 | Kim et al. | 356/477 |
| 6,490,043 B1 | * | 12/2002 | Kebabian | 356/453 |
| 6,606,158 B2 | * | 8/2003 | Rosenfeldt et al. | 356/477 |
| 6,762,829 B2 | * | 7/2004 | Babin et al. | 356/73.1 |
| 2003/0075676 A1 | * | 4/2003 | Ruchet et al. | 250/225 |

OTHER PUBLICATIONS

Cyr, N; Ruchet B; Girard A; Schinn G.W., "Poincare Sphere Analysis: Application to PMD Measurements of DWDM Components and Fibers", Proceedins of SubOptic 2001, pp 557–574.*

"Poincare Sphere Analysis: Application to PMD Measurements of DWDM components and Fibers" Cyr, N.; Ruchet, B.; Girard, A.; Schinn, G.W.

* cited by examiner

Primary Examiner—Samuel A. Turner
Assistant Examiner—Patrick Connolly
(74) Attorney, Agent, or Firm—Thomas Adams

(57) ABSTRACT

Apparatus for making wavelength-resolved polarimetric measurements comprises an interferometric source (10,12), for example a broadband source (10) and an optical interferometer unit (12), and a polarization generator unit (16) for generating different states of polarization of light received from the interferometric source and applying same to a device-under-test (30). A polarimeter unit (20) receives and polarimetrically-analyzes light from the device-under-test, converts the polarimetrically-analyzed light into electrical signals, and, using Fast Fourier Transform numerical analysis, computes therefrom the wavelength-resolved polarimetric measurements. Placing the optical interferometer unit (10,12) "upstream" not only of the device-under-test (30), but also of the polarisation generator unit (16), means that the latter substantially eliminates polarization dependent effects introduced by the former. The polarimeter (20) can still perform the necessary transformation even though the interferogram has been passed through the polarisation generator unit and the device-under-test.

8 Claims, 2 Drawing Sheets

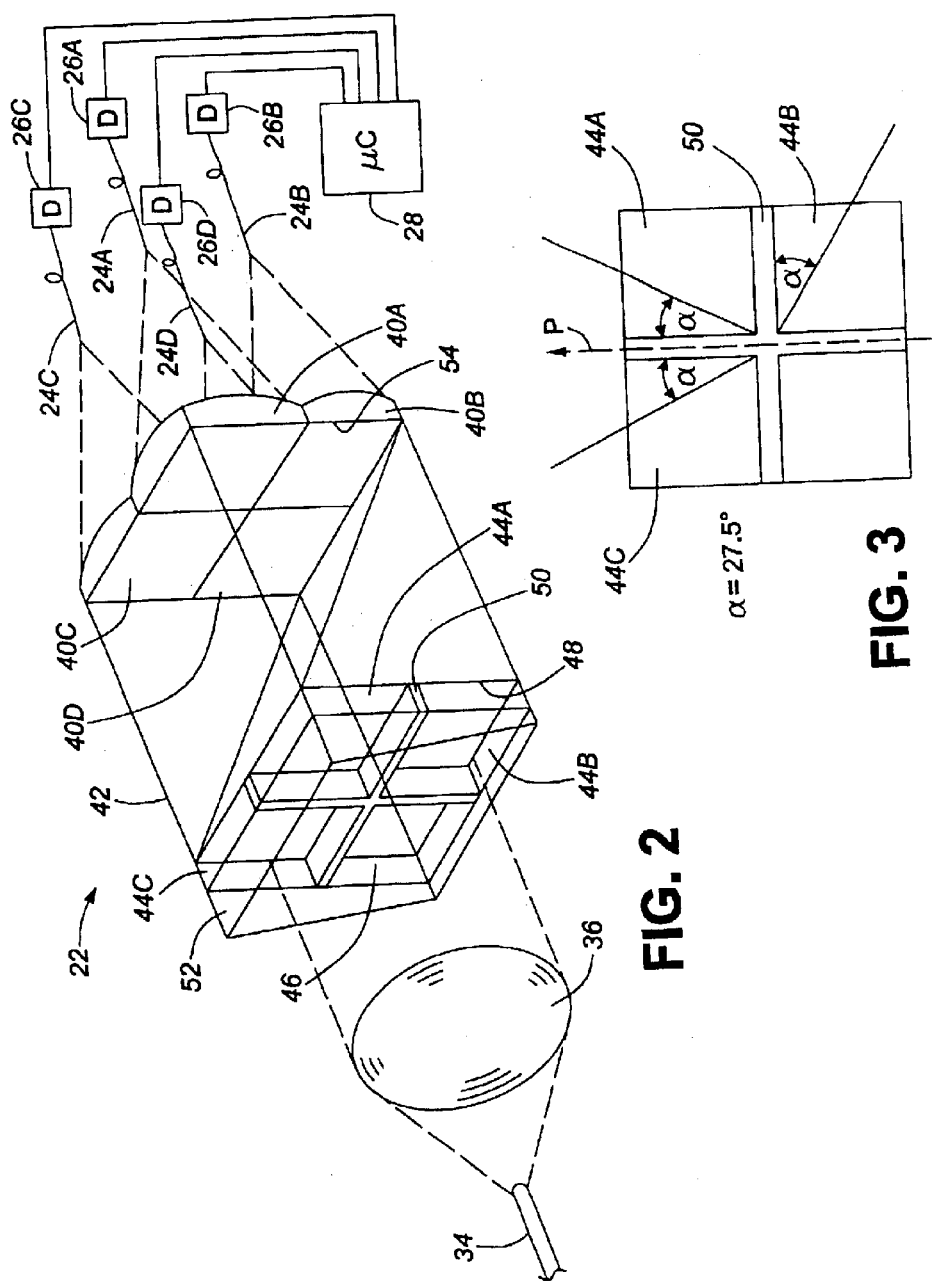

METHOD OF AND APPARATUS FOR MAKING WAVELENGTH-RESOLVED POLARIMETRIC MEASUREMENTS

This application claims priority from U.S. Provisional patent application No. 60/330,528 filed Oct. 24, 2001.

TECHNICAL FIELD

This invention relates to a method and apparatus for making wavelength-resolved polarimetric measurements to determine, for example, wavelength-dependent transmission properties, such as polarization mode dispersion, polarization-dependent loss, and so on. The invention is especially applicable to a method and apparatus wherein the wavelength-resolved measurement is carried out with an optical spectrum analyzer based upon a Michelson interferometer design.

BACKGROUND ART

It is often necessary to test elements of optical networks to determine, for example, polarization mode dispersion (PMD), differential group delay (DGD), polarization-dependent loss (PDL) or other characteristics, It is known to do so by means of a polarimetric PMD analysis technique, wherein light having each of several known states of polarization is launched into the device-under-test, and the corresponding transmitted state of polarization (SOP) is then analyzed, This so-called polarimetric data is then entered into known algorithms, such as the so-called Jones Matrix Eigenanalysis (JME) method or Poincaré Sphere Analysis (PSA) method, in order to calculate the desired parameters describing the PMD-related behaviour of the test device. A key component in such a test system is a real-time Stokes analyzer to measure Stokes polarization parameters or their equivalents. Additionally, there must be a means for providing wavelength-resolved measurements, a means for launching light into the device-under-test (DUT) with several known states of polarization (SOP), and means for analyzing the SOP of the light beam leaving the DUT.

A polarimetric analysis technique disclosed by Normand Cyr, Bernard Ruchet, André Girard and Gregory W. Schinn in an article entitled "Poincaré Sphere Analysis: Application to PMD Measurement of DWDM Components and Fibers", Proceedings of SubOptic 2001, Kyoto, Japan May 20–24, 2001 pp 571–574 uses a polarized broadband source, an SOP generator, and an element for spectrally resolving the light beam, followed by a polarimeter. Spectral resolution of the light beam can be effected using a scanning Michelson interferometer, which, when coupled with Fast-Fourier-Transform (FFT) numerical analysis, is functionally equivalent to an optical spectrum analyzer based on a more traditional grating-based scanning monochromator design. Unlike this latter design, wherein only a small spectral "slice" of the light is detected at any one time, a Michelson-interferometer-based spectrum analyzer detects the full spectrum of the light at all times, hence offering a much more efficient light-gathering capability and, consequently, a much faster measurement time.

A limitation of such a measurement technique, however, is that the Michelson interferometer itself usually exhibits undesirable PDL and a small, intrinsic PMD which limits the accuracy of the overall polarimetric PMD measurement system.

DISCLOSURE OF INVENTION

An object of the present invention is to mitigate this problem and, to this end, the placement of the interferometer unit in the overall polarimetric measurement system is changed.

According to the present invention, apparatus for making wavelength-resolved polarimetric measurements comprises an interferometric source means, for example a broadband source and an interferometer unit, a polarization generator unit for generating different states of polarization of light received from the interferometric source means and applying same to a device-under-test, and a polarimeter unit for receiving and polarimetrically-analyzing light from the device-under-test, converting the polarimetrically-analyzed light into electrical signals, and computing therefrom the wavelength-resolved polarimetric measurements.

Traditionally, an interferometer comprises an optical interferometer unit, which uses autocorrelation to produce an interferogram, and a processor unit which, following conversion of the interferogram to an electrical signal, uses FFT numerical analysis to transform the electrical signal into an optical spectrum of the light incident upon the optical, interferometer unit. The present invention is predicated upon the rather surprising realisation that, for measurement of the wavelength-dependent transmission properties of a DUT, the optical interferometer unit need not be "downstream" of the device-under-test, along with the processor, but can be located not only "upstream" of the device-under-test, but also "upstream" of the polarisation selection unit. The processor can still perform the necessary transformation even though the interferogram has been passed through the polarisation selection unit and the device-under-test. The FFT numerical analysis performed by the processor need not be changed.

Locating the optical interferometer unit upstream of the polarization generator unit means that the latter eliminates polarization dependent effects inherently introduced by the optical interferometer unit.

BRIEF DESCRIPTION OF THE DRAWINGS

An embodiment of the present invention will now be described by way of example only and with reference to the accompanying drawings in which:

FIG. 2 is a perspective schematic representation of a polarimetric analyzer unit of the OSA having three waveplates and a plain glass plate; and FIG. 3 is a detail end view illustrating respective axes of the three waveplates.

DETAILED DESCRIPTION OF PREFERRED EMBODIMENTS

Figure 1:
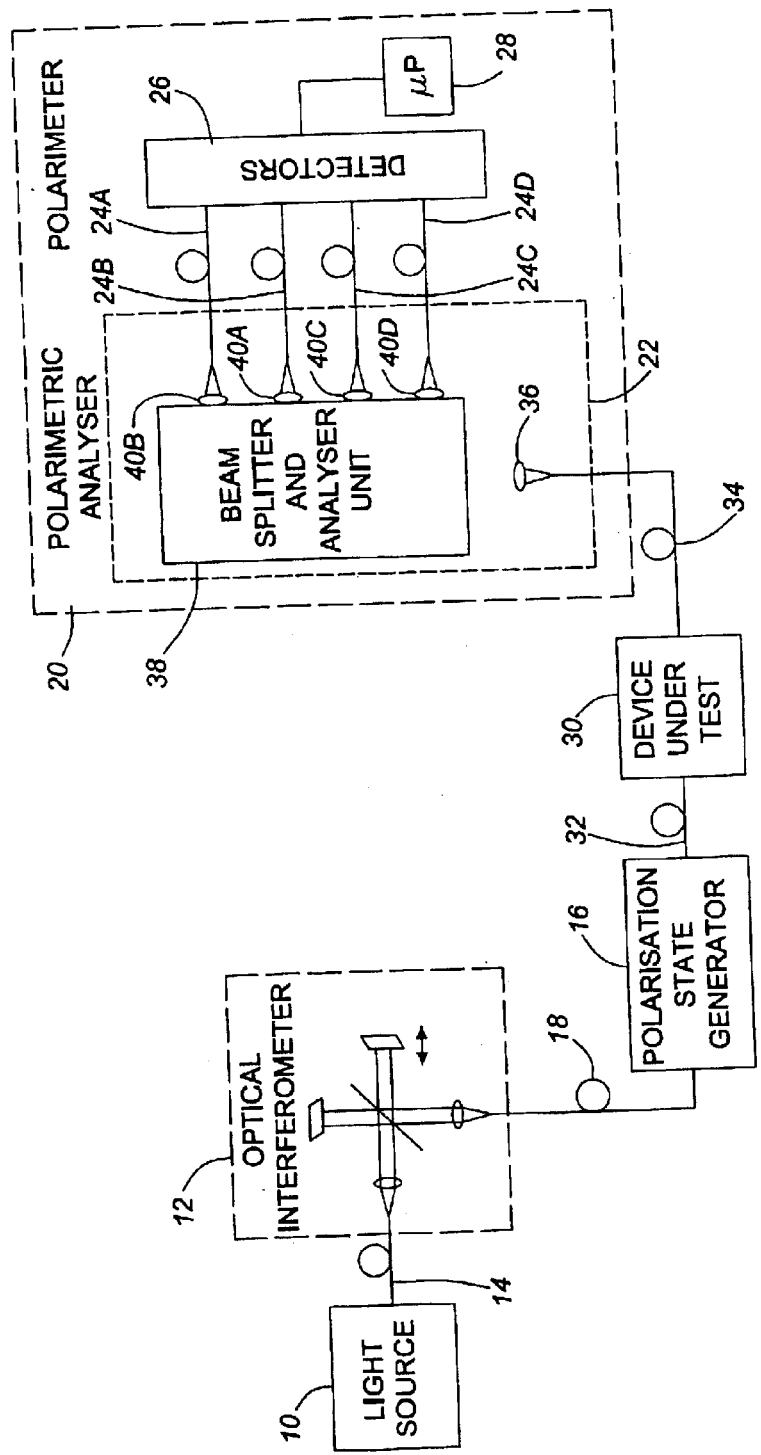
FIG. 1 is a block schematic diagram of an optical spectrum analyzer (OSA)

Referring to the drawing, apparatus for making wavelength resolved polarimetric measurements comprises an interferometric source, specifically a broadband light source 10 and an optical spectrum analyzer, specifically a Michelson interferometer 12, interconnected by an optical fiber 14, a polarization state generator 16, for example a rotating polarizer, coupled to the output of the interferometer 12 by an optical fiber 18, and a polarimeter 20, i.e., an instrument for measuring SOP of a light beam. The polarimeter 20 comprises a polarimetric analyzer 22 having four output ports connected by optical fibers 24A–24D, respectively, to a bank of detectors 26 which are connected to a processor 28. Preferably, the fibers 24A–24D are multimode fibers. A device-under-test 30 is connected by an optical fiber 32 to an output of the polarization state generator 16 and by an optical fiber 34 to an input of the polarimetric analyzer 22.

Within the polarimetric analyzer 22, an input lens 36 collimates light from the optical fiber 34 and applies it to a beam splitter and analyzer unit 38, and a bank of four output lenses 40A–40D converge light from the analyzers into the output optical fibers 24A–24D, respectively. Preferably, the output lenses 40A–40D are attached directly to the beam splitter and analyzer unit's output ports, so that only the coupling between the lenses 40A–40D and the optical fibers 24A–24D, respectively, is a free space arrangement. The polarimetric analyzer unit 22 comprises a device for decomposing the light beam from fiber 34 into components with predetermined SOPs enabling computation of the Stokes parameters. A suitable polarimetric analyzer unit having an advantageous composite construction is the subject of U.S. patent application No. 10/278,081 filed contemporaneously herewith, and will now be described.

Referring to FIGS. 2 and 3, the polarimetric analyzer unit 22 comprises a parallelepiped linear polarizer 42, specifically a Glan-Taylor prism, having three square waveplates 44A, 44B and 44C each having a retardation of $\lambda/3$, i.e., with phase retardation of $2\pi/3$, and a transparent plate (i.e., a window with zero retardation) 46 adhered to its input face 48 using suitable optical cement. The polarizer 42 conveniently is made of calcite and is of an air-gap design, and the plate 46, which has the same thickness as the waveplates 44A–44C, conveniently is made of glass. The waveplates 44A, 44B and 44C and the glass plate 46 comprise quadrants which together cover the input face 48 of the polarizer 42. The are placed into respective openings of a cruciform opaque divider 50 which has one limb (shown vertical in FIGS. 2 and 3) aligned in the same sense as the polarizer axis P, and attached to adjacent limbs of the divider by adhesive. The cruciform divider 50 "slices" the input light beam cleanly into four portions. A wedge-shaped plate 52 is adhered, using index matching glue, to the front of the waveplates 44A, 44B and 44C and the glass plate 46 and serves to reduce reflections that could lead to undesirable Fabry-Perot-type interferometric noise. Input means comprises collimating lens 36 which collimates light received from the single mode input optical fiber 34 and directs the collimated light beam onto the waveplates 44A, 44B and 44C and the glass plate 46, so that each receives an equal portion of the light beam.

As shown in FIG. 2, the lenses 40A, 40B, 40C and 40D are rectangular, specifically square. They are adhered to the output face 54 of the linear polarizer 42 and receive the corresponding four light components from the waveplates 44A, 44B, 44C and glass plate 46, respectively and focus them into the four multimode output optical fibers 24A, 24B, 24C and 24D, respectively, which are coupled to the set of four photodetectors 26A, 26B, 26C and 26D, respectively. The photodetectors 26A, 26B, 26C and 26D convert the optical signals into electrical signals and convey them to the processor 28 which uses their intensities to compute the Stokes parameters.

The three waveplates 44A, 44B and 44C are identical and each has a fast axis at an angle of about 27.5 degrees to one edge. As shown in FIG. 3, however, each of the waveplates 44A, 44B. and 44C is disposed with its fast axis at a different angle relative to the polarizer axis P which, in FIG. 3, is shown as extending vertically in the plane of the drawing. Thus, assuming clockwise rotation from the vertical, the fast axes of the waveplates 44A, 44B and 44C are at angles of 27.5 degrees, 117.5 degrees and 332.5 degrees, respectively.

The measured intensity or power of the signal received by way of glass plate 46 and detector 26D represents the degree of polarization and is used with the intensities measured by way of the three waveplates 44A, 44B and 44C and the detectors 26A, 26B and 26C to calculate the Stokes parameters.

It is instructive to consider the operation of the device as if the linear polarizer 42 were in front of the waveplates 44A, 44B and 44C. Thus, the linear polarizer 42 exhibits high transmission for one linear SOP and extinguishes the orthogonal linear SOP (at 180 degrees on the Poincaré sphere). The preferred Glan-Taylor polarizer is recognized as having a high degree of extinction. On leaving the polarizer 42, therefore, the SOP of the light is along the polarizer axis P. Each waveplate rotates the SOP about the sphere, the resultant polarizations corresponding to the equivalent axis of the analyzers.

It should be noted that, in contrast to known methods for analysing the SOP of a light beam, all four beams pass through a, preferably common, linear polarizer used as an analyser. Hence, no one light beam permits a direct determination of the Stokes parameter SO. Once the system has been suitably calibrated, the signals from the four detectors permit the determination of the four Stokes parameters.

It should also be noted that optical spectrum analyzers which use analyzers permitting measurement of Stokes parameters S0, S1, S2 and S3, or a linear combination thereof, and having alignments based upon the mathematics used to compute the Stokes vectors, are optimized to square with the "first" mathematical solution to the detriment of hardware optimization. Embodiments of the present invention using four polarization analyzers with their axes linearly independent, so that a nonsingular matrix describing the transformation relating the intensities measured at the four detectors to the four Stokes parameters can be constructed, allow more freedom for the hardware to be optimized. While the transformation matrix may be based upon the design, it is preferred to produce it by measurement, i.e., calibration, which gives better precision and reliability. Moreover, the calibration changes little with time or temperature and yet changes smoothly with wavelength, which is desirable.

Thus, the calibration produces, for each wavelength, a calibration transformation matrix that relates the measured intensities to the Stokes vectors. This calibration procedure can be described as follows.

First one generates four known SOPs, each having a DOP of 100%. Each of these states is, in turn, sent to the polarimeter, where one measures the resulting electrical currents.

$$\text{Generated SOPs:} \begin{bmatrix} S_{01} \\ S_{11} \\ S_{21} \\ S_{31} \end{bmatrix} \begin{bmatrix} S_{02} \\ S_{12} \\ S_{22} \\ S_{32} \end{bmatrix} \begin{bmatrix} S_{03} \\ S_{13} \\ S_{23} \\ S_{33} \end{bmatrix} \begin{bmatrix} S_{04} \\ S_{14} \\ S_{24} \\ S_{34} \end{bmatrix}$$

$$\text{Measured currents:} \begin{bmatrix} I_{11} \\ I_{21} \\ I_{31} \\ I_{41} \end{bmatrix} \begin{bmatrix} I_{12} \\ I_{22} \\ I_{32} \\ I_{42} \end{bmatrix} \begin{bmatrix} I_{13} \\ I_{23} \\ I_{33} \\ I_{43} \end{bmatrix} \begin{bmatrix} I_{14} \\ S_{24} \\ I_{34} \\ I_{44} \end{bmatrix}$$

These four SOPs can be grouped into a single 4×4 matrix, and the measured currents grouped into another matrix;

$$\text{Stokes} = \begin{bmatrix} S_{01} & S_{02} & S_{03} & S_{4} \\ S_{11} & S_{12} & S_{13} & S_{14} \\ S_{21} & S_{23} & S_{23} & S_{24} \\ S_{31} & S_{33} & S_{33} & S_{34} \end{bmatrix}$$

-continued $$\text{Intensity} = \begin{bmatrix} I_{11} & I_{12} & I_{13} & I_{14} \\ I_{21} & I_{22} & I_{23} & I_{24} \\ I_{31} & I_{32} & I_{33} & I_{34} \\ I_{41} & I_{43} & I_{43} & I_{44} \end{bmatrix}$$

Now, the Stokes matrix is related to the intensity matrix via:

$$(\text{Stokes}) = M_{Calibration} \cdot (\text{Intensity})$$

The Calibration transformation matrix can then be directly calculated via:

$$M_{calibration} = \text{Stokes} \cdot (\text{Intensity})^{-1}$$

An advantageous and novel feature of the above-described invention is that all four portions of the light beam pass through a common polarizer serving as a linear analyzer element. This allows for a simple and compact design. The only real alignment of the polarizing elements (i.e., waveplates plus polarizer) is very straightforward as the three square waveplates can be "cut" from the same waveplate material, with the fast axis at 27.5 degrees from one edge. The three waveplates are then placed in the appropriate quadrant of the cruciform, whose "vertical" limb is aligned with the polarization axis P, and setting of the desired orientation of the respective fast axes then involves only "flipping" of one waveplate and rotation of another waveplate by ninety degrees. Of course, there still is alignment via four lenses into the four optical fibers, but this does not involve polarizing elements, as such.

An advantage of coupling the four outputs from the lenses 26A, 26B, 26C and 26D by means of the four optical fibers 30A, 30B, 30C and 30D, respectively, is that it eliminates, or at least significantly reduces, inaccuracies which are common in direct detection of a free-space beam by a detector, which can result in changes in the registration between the output beams and their respective detectors. As a general rule, when light is cut by sharp edges of any optical element, there is some diffraction causing the light beam to spread. Because there are four output light beams, any spreading could result in not only a change in registration but also in increased cross-talk. Launching the light beams into optical fibers for conveyance to the detector unit 26 permits better spatial filtering of all but the desired central portion of each light beam, i.e., less affected by edge effects of the waveplates and lenses, which may reduce cross-talk.

It should be appreciated that the waveplates 44A, 44B and 44C and the glass plate 46 need not be square but could be circular, oval or any other suitable form. However, such a design would be less efficient at collecting the incident light, particularly due to loss of power in the centre of the beam, and would require additional alignment steps in fabrication to ensure that the angles of the fast axes of the waveplates were correctly aligned.

It should also be noted that, if DOP is not required, either, but not both, of the waveplates 44A and 44C could be omitted.

Various other alternatives and modifications are possible within the scope of the present invention. For example, the Michelson interferometer could be replaced by an alternative interferometer which detects the full spectrum of the light at all times.

An advantage of positioning the Michelson interferometer before the polarization generator is that polarization dependent effects produced in the Michelson interferometer, which generally are unavoidable, will be substantially removed by the polarization generator, leading to more accurate measurements.

Although single mode fiber provides excellent spatial filtering because of its small core size, launching of the light beams into single mode fibers would be inefficient. Multimode fiber is preferred, therefore, because it provides a good compromise between good spatial filtering and efficient light launching.

Advantageously, embodiments of this invention, in which the output beams from the polarimetric analyzer are supplied directly into the fibers 24A–24D, greatly facilitate the measurement of very small (femtosecond) levels of PMD, which entails stringent requirements of precision and stability.

What is claimed is:

1. Apparatus for making wavelength-resolved polarimetric measurements comprising an interferometric source means (10,12), a polarization generator unit (16) for generating different states of polarization of light received from the interferometric source means and applying same to a device-under-test (30), and a polarimeter unit (20) for receiving and polarimetrically-analyzing light from the device-under-test, converting the polarimetrically-analyzed light into electrical signals, and computing therefrom the wavelength-resolved polarimetric measurements.

2. Apparatus according to claim 1, wherein the interferometric source means comprises a broadband source (10) and an optical interferometer unit 12.

3. Apparatus according to claim 1, wherein the polarimeter unit (20) comprises a polarimetric analyzer (22), a detection unit (26) and a processor unit (28), the polarimetric analyzer (22) for decomposing light from the device-under-test (30) into at least three components having different states of polarization that have a predetermined relationship, the polarimeter unit further comprising at least three optical fibers (24A–24C) each for coupling a respective one of said components to the detection unit (26), the detection unit (26) converting the components into corresponding electrical signals and supplying the electrical signals to the processor unit (28) for computation of the wavelength-resolved polarimetric measurements.

4. Apparatus according to claim 1, wherein the interferometric source means comprises a broadband source (10) and an optical interferometer unit 12, and the polarimeter unit (20) comprises a polarimetric analyzer (22), a detection unit (26) and a processor unit (28), the polarimetric analyzer (22) for decomposing light from the device-under-test (30) into at least three components having different states of polarization that have a predetermined relationship, the polarimeter unit further comprising at least three optical fibers (24A–24C) each for coupling a respective one of said components to the detection unit (26), the detection unit (26) converting the components into corresponding electrical signals and supplying the electrical signals to the processor unit (28) for computation of the wavelength-resolved polarimetric measurements.

5. Apparatus according to claim 1, wherein the polarimeter unit (20) uses Fast Fourier Transform to compute said measurements.

6. Apparatus according to claim 1, wherein the interferometric source means comprises a broadband source (10) and an optical interferometer unit 12, and the polarimeter unit (20) uses Fast Fourier Transform to compute said measurements.

7. Apparatus according to claim 1, wherein the polarimeter unit (20) comprises a polarimetric analyzer (22), a detection unit (26) and a processor unit (28), the polarimetric analyzer (22) for decomposing light from the device-undertest (30) into at least three components having different states of polarization that have a predetermined relationship, the polarimeter unit further comprising at least three optical fibers (24A–24C) each for coupling a respective one of said components to the detection unit (26), the detection unit (26) converting the components into corresponding electrical signals and supplying the electrical signals to the processor unit (28) for computation of the wavelength-resolved polarimetric measurements, and wherein the polarimeter unit (20) uses Fast Fourier Transform to compute said measurements.

8. Apparatus according to claim 1, wherein the interferometric source means comprises a broadband source (10) and an optical interferometer unit 12, and the polarimeter unit (20) comprises a polarimetric analyzer (22), a detection unit (26) and a processor unit (28), the polarimetric analyzer (22) for decomposing light from the device-under-test (30) into at least three components having different states of polarization that have a predetermined relationship, the polarimeter unit further comprising at least three optical fibers (24A–24C) each for coupling a respective one of said components to the detection unit (26), the detection unit (26) converting the components into corresponding electrical signals and supplying the electrical signals to the processor unit (28) for computation of the wavelength-resolved polarimetric measurements, and the polarimeter unit (20) uses Fast Fourier Transform to compute said measurements.

* * * * *